(12) United States Patent
Michaels et al.

(10) Patent No.: US 12,158,005 B1
(45) Date of Patent: Dec. 3, 2024

(54) COATED SCRIM REINFORCED ROOFING MEMBRANE

(71) Applicant: Milliken & Company, Spartanburg, SC (US)

(72) Inventors: Emily W. Michaels, Taylors, SC (US); Dennis A. Goff, Chesnee, SC (US); Gary Lee Hoenshel, Greer, SC (US); David W. Martin, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 363 days.

(21) Appl. No.: 17/378,264

(22) Filed: Jul. 16, 2021

(51) Int. Cl.
| | |
|---|---|
| *E04D 5/10* | (2006.01) |
| *B32B 5/02* | (2006.01) |
| *B32B 27/12* | (2006.01) |
| *B32B 27/30* | (2006.01) |
| *B32B 27/32* | (2006.01) |
| *E04D 5/06* | (2006.01) |

(52) U.S. Cl.
CPC ............... *E04D 5/10* (2013.01); *B32B 5/026* (2013.01); *B32B 27/12* (2013.01); *B32B 27/304* (2013.01); *B32B 27/32* (2013.01); *E04D 5/06* (2013.01); *B32B 2250/03* (2013.01); *B32B 2250/40* (2013.01); *B32B 2255/02* (2013.01); *B32B 2255/26* (2013.01); *B32B 2262/0276* (2013.01); *B32B 2307/718* (2013.01); *B32B 2419/06* (2013.01)

(58) Field of Classification Search
CPC .. E04D 5/10; E04D 5/06; B32B 5/026; B32B 27/12; B32B 27/304; B32B 27/32; B32B 2250/03; B32B 2250/40; B32B 2255/02; B32B 2255/26; B32B 2262/0276; B32B 2307/718; B32B 2419/06
See application file for complete search history.

(56) References Cited

U.S. PATENT DOCUMENTS

| | | | |
|---|---|---|---|
| 3,573,230 | A | 3/1971 | Van Voorhees |
| 4,073,998 | A | 2/1978 | O'Connor |
| 4,762,744 | A | 8/1988 | Woiceshyn |
| 5,540,971 | A | 7/1996 | Daurer |
| 5,822,943 | A | 10/1998 | Frankoski |
| 6,054,205 | A | 4/2000 | Newman |
| 6,355,329 | B1 | 3/2002 | Rose |
| 6,652,951 | B2 | 11/2003 | Gautreau |
| 8,590,267 | B2 | 11/2013 | Jaffee |

(Continued)

*Primary Examiner* — Elizabeth M Imani
(74) *Attorney, Agent, or Firm* — Cheryl J. Brickey

(57) ABSTRACT

A scrim reinforced roofing membrane containing a coated scrim layer, a first membrane layer on the first side of the coated scrim layer, and a second membrane layer on the second side of the coated scrim layer. The coated scrim is fully embedded and encapsulated in the membrane layers. The coated scrim layer contains a scrim fabric which contains a plurality of warp yarns in a first direction and a plurality of weft yarns in a second direction approximately perpendicular to the first direction, where the warp yarns cross the weft yarns at crossing points. The coated scrim also contains a coating which contains polyvinyl acetate and second polymer where the second polymer is fluorocarbon-free. The coating contains less than about 0.01% wt. fluorine and is located along the length of the warp and weft yarns and is located between the warp and weft yarns at the crossing points.

11 Claims, 1 Drawing Sheet

(56) References Cited

U.S. PATENT DOCUMENTS

| | | |
|---|---|---|
| 8,669,196 B2 | 3/2014 | Mehta |
| 8,791,193 B2 | 7/2014 | Wang |
| 8,852,368 B2 | 10/2014 | Herbert |
| 10,041,207 B2 | 8/2018 | Martin |
| 10,072,419 B2 | 9/2018 | Martin |
| 2002/0132078 A1 | 9/2002 | Wong |
| 2003/0100233 A1 | 5/2003 | Fynan |
| 2004/0185734 A1 | 9/2004 | Gray |
| 2007/0281562 A1 | 12/2007 | Kohlman |
| 2009/0126411 A1 | 5/2009 | Callaway |
| 2010/0167611 A1* | 7/2010 | McLennan ............ C08F 218/08 526/326 |
| 2016/0207278 A1* | 7/2016 | Martin ...................... B32B 5/08 |
| 2016/0265156 A1* | 9/2016 | Martin .................... B32B 5/024 |

* cited by examiner

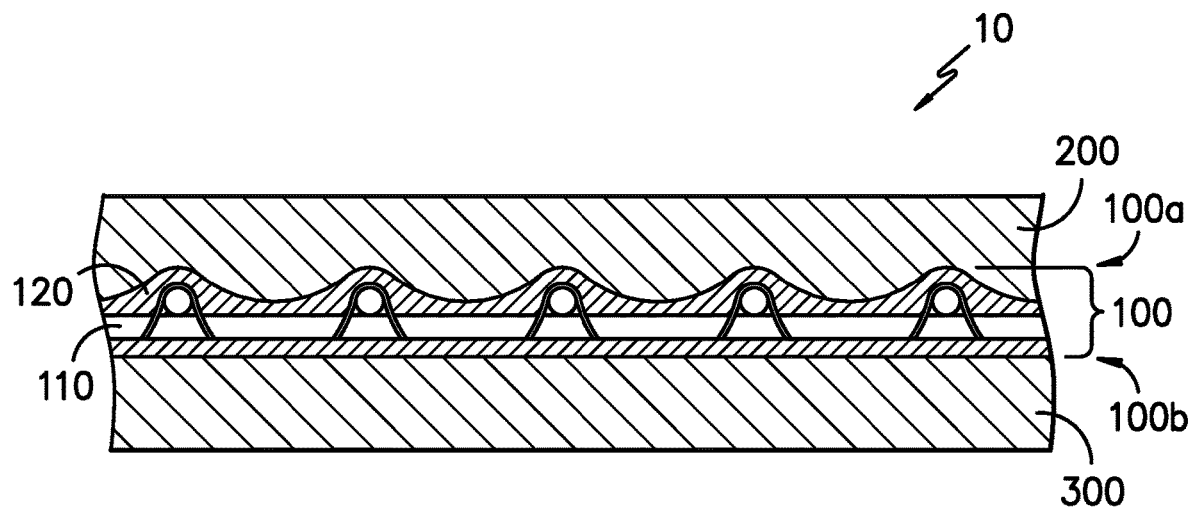
FIG. -1-
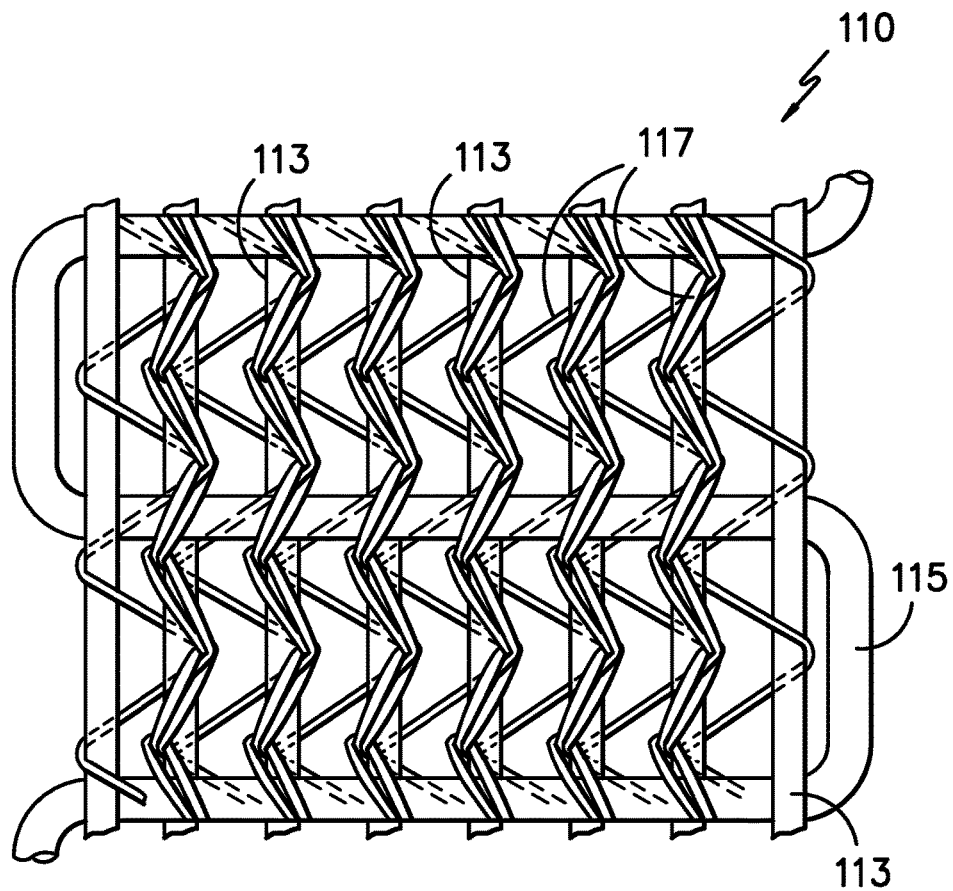
FIG. -2-

COATED SCRIM REINFORCED ROOFING MEMBRANE

TECHNICAL FIELD

The present disclosure relates generally to roofing membranes containing a coated scrim.

BACKGROUND

Many membranes, such as membranes used as roofing, contain a fabric layer embedded into a polymer. There is a need for a membrane with enhanced tear resistance.

BRIEF SUMMARY

A scrim reinforced roofing membrane containing a coated scrim layer, a first membrane layer on the first side of the coated scrim layer, and a second membrane layer on the second side of the coated scrim layer. The coated scrim is fully embedded and encapsulated in the membrane layers. The coated scrim layer contains a scrim fabric which contains a plurality of warp yarns in a first direction and a plurality of weft yarns in a second direction approximately perpendicular to the first direction, where the warp yarns cross the weft yarns at crossing points. The coated scrim also contains a coating which contains polyvinyl acetate and second polymer where the second polymer is fluorocarbon-free. The coating contains less than about 0.01% wt. fluorine and is located along the length of the warp and weft yarns and is located between the warp and weft yarns at the crossing points.

BRIEF DESCRIPTION OF THE DRAWING(S)

Exemplary embodiments will now be described by way of example, with reference to the accompanying drawings, wherein:

FIG. 1 is a cross-sectional illustration of one embodiment of the scrim reinforced roofing membrane.

FIG. 2 is an illustration of one embodiment of a scrim fabric.

DETAILED DESCRIPTION

FIG. 1 illustrates one embodiment of the scrim reinforced roofing membrane 10. The membrane 10 contains a coated scrim layer 100 having a first side 100a and a second side 100b. The coated scrim layer contains a scrim fabric 110 and a coating 120. The scrim fabric 110 comprises a plurality of warp yarns in a first direction and a plurality of weft yarns in a second direction approximately perpendicular to the first direction. The warp yarns cross the weft yarns at crossing points. The coating 120 comprises polyvinyl acetate and is located along the length of the warp yarns and the weft yarns and is located between the warp and weft yarns at the crossing points. The scrim reinforced roofing membrane 10 contains at least a first polyvinyl chloride layer 200 on the first side 100a of the coated scrim layer 100. The coated scrim 100 is at least partially embedded in the first polyvinyl chloride layer 200. FIG. 1 shows an optional second polyvinyl chloride layer 300 on the second side 100b of the coated scrim layer 100.

The scrim fabric 110 may be any suitable scrim layer including any suitable light-weight woven, knit, or nonwoven fabric. Preferably, the scrim layer is a weft inserted warp knit scrim, one example of which is shown in FIG. 2. The weft inserted warp knit scrim 110 contains a plurality of warp yarns 113, weft yarns 115, and stitching yarns 117. The stitching yarns may have any suitable stitching pattern, including tricot stitches (shown in FIG. 2) or pillar stitches, or other stitches. While the fabric in Figure has the weft is laid in every third course, or every third row of stitches, the weft may be inlaid in any desirable pattern, preferably every course. Additionally, the weft yarn in FIG. 2 is a continuous weft, in an alternatively preferred embodiment, the weft yarn is a laid in yarn from a warp bar with a long shot and the weft may be cut on both ends after it is laid in.

The scrim fabric 110 is preferably open meaning that there are large amounts of open space between the yarns within the scrim layer 110. This is preferred so that there can be good adhesion between all of the layers within the scrim reinforced roofing membrane 10. In one embodiment, the scrim layer contains between 6 and 18 warp yarns per inch, more preferably between 8 and 12 warp yarns per inch. In another embodiment, the scrim layer contains between 4 and 18 weft yarns per inch, more preferably between 7 and 12 weft yarns per inch.

The yarns used in the scrim fabric 110 may be any suitable yarn, including but not limited to a spun staple yarn, a multifilament yarn, and/or a monofilament yarn. "Yarn", in this application, as used herein includes a monofilament elongated body, a multifilament elongated body, ribbon, strip, fiber, tape, and the like. The term yarn includes a plurality of any one or combination of the above. Some suitable materials for the yarns include polyamide, aramids (including meta and para forms), rayon, PVA (polyvinyl alcohol), polyester, polyolefin, polyvinyl, nylon (including nylon 6, nylon 6, 6, and nylon 4,6), polyethylene naphthalate (PEN), cotton, steel, carbon, fiberglass, steel, polyacrylic or any other suitable artificial or natural fiber. In one embodiment, the yarns in the scrim layer 110 are preferably continuous multifilament polyester. Continuous multifilament polyester has been shown to have good adhesion and strength characteristics.

Within the coated scrim layer 100, the scrim fabric 110 is coated with a coating 120 comprising polyvinyl acetate (PVAC) and a second polymer. The coating may also include other suitable additives such as adhesion promoters, anti-wicking chemistries, colorants, anti-microbial chemistries, abrasion resistance, UV stabilizers, and the like. Preferably, the coating 120 also contains a second polymer which is a fluorocarbon-free chemistry. The preferred ratio by weight of PVAC to second polymer is in the range of between about 10:1 and 20:1, more preferably about 16:1. The preferred amount of total solids add-on is the range of between about 1 and 30% wt., more preferably between about 5 and 15% wt., more preferably between about 8 and 12% wt., more preferably approximately 10% wt. Coating application is by way of a submerged dip with heated can drying immediately after. The coating contains less than about 0.01% wt. fluorine. In another embodiment, the coating is essentially fluorine-free defined as containing less than 0.005% wt. fluorine. In another embodiment, the scrim reinforced roofing membrane is essentially fluorine-free defined as containing less than 0.005% wt. fluorine. Having no fluorine or fluorocarbon chemistries is important for environmental reasons.

The second polymer in the coating (120) can be any suitable water repellant material that does not contain a fluorine atom. This can include, but not limited to, silicone polymers, wax-containing compositions, alkyl-substituted acrylate polymers, chlorine-containing polymers, and combinations thereof. Preferably, the non-fluorinated water repellant second polymer is selected from the group of alkyl-substituted acrylates and alkyl-substituted amide ethers.

The second polymer in the coating (120) is more preferably a copolymer formed by the reaction of
  a) an unsaturated polymerizable monomer of the general form:

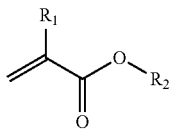

where R1 is a hydrogen, methyl, or ethyl group, and R2 is selected from the group of a long-chain branched or linear hydrocarbon, or a long chain hydrocarbon amide, and optionally:
  b) a vinyl or vinylidene chloride monomer.

In another embodiment, the second polymer in the coating (120) is a polymer or copolymer formed by reacting monomer of the general formula:

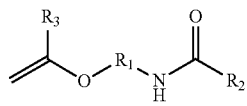

where R1 is a hydrocarbon group consisting of 1-5 carbons, R2 is a long-chain hydrocarbon group of greater than 7 carbons, and R3 is selected from the group of hydrogen, methyl group or an ethyl group.

The coating is located along the length of the warp yarns and the weft yarns and is located between the warp and weft yarns at the crossing points. FIG. 1 is not drawn to scale, typically the coating 120 on the scrim fabric 110 is very thin and cannot be easily seen (the coating 120 in the Figure was enlarged so that it was more easily seen). Preferably, the coating 120 does not window the scrim fabric 110 meaning that it does not fill the open space within the scrim fabric 110 with a film of coating.

The scrim reinforced roofing membrane 10 contains at least a first membrane layer 200 on the first side 100a of the coated scrim layer 100. The coated scrim 100 is at least partially embedded in the first membrane layer 200. Preferably the coated scrim layer 100 is fully embedded and encapsulated by the membrane layer(s) 200, 300. FIG. 1 shows an optional second membrane layer 300 on the second side 100b of the coated scrim layer 100.

In one preferred embodiment, the first and second membrane layers 200, 300 are polyvinyl chloride (PVC) layers which have been found to produce roofing membranes with good properties and cost effectiveness. In one embodiment, the PVC layer(s) 200, 300 have a thickness of between about 10-40 mils, more preferably between about 15-40 mils, more preferably between about 1.2 and 2.2 mm. When both the first PVC layer 200 and the second PVC layer 300 are used in the membrane 10, preferably the two layers 200, 300 touch and adhere to each other through the open areas of the scrim fabric 110.

In another embodiment, the first and second membrane layers 200 are thermoplastic olefin (TPO). TPO layers have been found to produce roofing membranes with good properties and cost effectiveness. In one embodiment, the TPO layer(s) 200, 300 have a thickness of between about 10-40 mils, more preferably between about 15-40 mils, more preferably between about 1.2 and 2.2 mm. When both the first TPO layer 200 and the second TPO layer 300 are used in the membrane 10, preferably the two layers 200, 300 touch and adhere to each other through the open areas of the scrim fabric 110.

The membrane layer(s) 200, 300 may be applied to the coated scrim layer 100 in any suitable manner such as coating, extruding, and lamination. In one preferred embodiment, the membrane layer(s) 200, 300 is laminated onto the coated scrim layer 100. The membrane layer(s) 200, 300 are delivered to the coated scrim layer 100 as a free standing film that is then adhered to the coated scrim layer 100 using heat and/or pressure and/or adhesive. The membrane layer(s) 200, 300 may be applied to only one side of the coated scrim layer 100 or may be applied to both sides of the knit fabric sequentially or simultaneously.

In another preferred embodiment, the membrane layer(s) 200, 300 are extruded onto the coated scrim layer 100. The membrane layer(s) 200, 300 are delivered to the coated scrim layer 100 in a molten state on one or both sides of the coated scrim layer 100.

The membrane 10 may be subjected to additional processing steps such as coatings, surface treatments, adhering the membrane to additional components, and calendaring. Calendaring further compresses the coated scrim layer 100 and the membrane layer(s) 200, 300 to deliver a thinner membrane 10. Calendaring may be part of the process of coating the coated scrim layer 100 with the PVC layer(s) 200, 300 such as in the lamination process or a separate operation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A scrim reinforced roofing membrane comprising:
    a coated scrim layer having a first side and a second side, wherein the coated scrim layer comprises:
        a scrim fabric comprises a plurality of warp yarns in a first direction and a plurality of weft yarns in a second direction approximately perpendicular to the first direction, wherein the warp yarns cross the weft yarns at crossing points; and,
        a coating comprising polyvinyl acetate and a second polymer, wherein the second polymer is fluorocarbon-free, wherein the coating contains less than about 0.01% wt. fluorine, wherein the coating is located along the length of the warp yarns and the weft yarns and is located between the warp and weft yarns at the crossing points, and wherein the second polymer is composed of alkyl-substituted acrylate esters monomers of the structure (200) and alkyl-substituted vinyl ether amides monomers of structure (300),

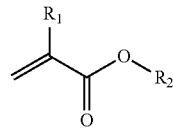
(200)

where R1 is a hydrogen, methyl, or ethyl group, and R2 is selected from the group of a long-chain branched or linear hydrocarbon, or a long chain hydrocarbon amide,

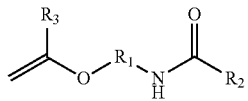
(300)

where R1 is a hydrocarbon group consisting of 1-5 carbons, R2 is a long-chain hydrocarbon group of greater than 7 carbons, and R3 is selected from the group of hydrogen, methyl group or an ethyl group;
    a first membrane layer on the first side of the coated scrim layer; and,
    a second membrane layer on the second side of the coated scrim layer,
    wherein the coated scrim is fully embedded and encapsulated in the membrane layers.

2. The scrim reinforced roofing membrane of claim 1, wherein the coating is essentially fluorine-free defined as containing less than 0.005% wt. fluorine.

3. The scrim reinforced roofing membrane of claim 1, wherein the scrim reinforced roofing membrane is essentially fluorine-free defined as containing less than 0.005% wt. fluorine.

4. The scrim reinforced roofing membrane of claim 1, wherein the first membrane layer and the second membrane layer comprise polyvinyl chloride.

5. The scrim reinforced roofing membrane of claim 1, wherein the first membrane layer and the second membrane layer comprise thermoplastic olefin.

6. The scrim reinforced roofing membrane of claim 1, wherein the scrim fabric is a weft insert warp knit fabric.

7. The scrim reinforced roofing membrane of claim 1, wherein the warp yarns and weft yarns of the scrim fabric comprise polyester yarns.

8. The scrim reinforced roofing member of claim 3, wherein the thickness of each polyvinyl chloride layer is between 10 and 40 mils.

9. The scrim reinforced roofing member of claim 1, wherein the coating has a weight of between about 1 and 30% of the scrim.

10. The scrim reinforced roofing member of claim 1, wherein the coating has a weight of between about 5 and 15% of the scrim.

11. The scrim reinforced roofing member of claim 1, wherein the ratio by weight of polyvinyl acetate to second polymer is in the range of between about 10:1 and 20:1.

* * * * *